United States Patent [19]

Bub

[11] 3,994,050

[45] Nov. 30, 1976

[54] FASTENING CLIPS

[76] Inventor: Hans Werner Alfred Bub, Plot 358 N. Riding, Randburg, South Africa

[22] Filed: June 20, 1975

[21] Appl. No.: 588,704

[30] Foreign Application Priority Data

June 20, 1975 South Africa.................... 74/3956

[52] U.S. Cl............................. 24/255 TC; 248/468
[51] Int. Cl.².................... A44B 21/00; A47G 1/16
[58] Field of Search................... 248/466, 468, 491; 24/73 CF, 73 SM, 73 B, 243 P, 81 BF, 67.9, 67.11, 49 C, 252 TH, 255 FC, 255 TC, 259 FF, 259 FC, 255 P, 84 B

[56] References Cited
UNITED STATES PATENTS

| 601,354 | 3/1898 | Osmers............................ 24/259 FF |
| 2,511,461 | 6/1950 | Carroll ...................... 24/73 SM UX |
| 2,665,611 | 1/1954 | Smith.......................... 248/226 R X |
| 2,895,247 | 7/1959 | Beck et al................ 24/255 FC UX |
| 2,916,113 | 12/1959 | Lee ................................. 24/73 B X |
| 2,992,464 | 7/1961 | Muhlemann..................... 248/491 X |
| 3,001,748 | 9/1961 | Austin................................ 248/468 |
| 3,019,954 | 2/1962 | Faltin ............................. 24/84 B X |
| 3,252,679 | 5/1966 | Bell................................. 24/73 B X |

FOREIGN PATENTS OR APPLICATIONS

| 626,199 | 2/1936 | Germany......................... 24/255 TC |
| 710,107 | 6/1954 | United Kingdom.................. 24/73 B |

*Primary Examiner*—Donald A. Griffin
*Attorney, Agent, or Firm*—Millen, Raptes & White

[57] ABSTRACT

A fastening clip for mounting paintings and the like which comprises a piece of spring material, having two substantially opposing pincers which are adapted for clamping something between them, a connecting part extending from the first pincer to the second pincer and including a spring loop, which extends from the second pincer, with the feature that the spring loop is extended in a general direction substantially orthogonal to an imaginary plane in which the pincers move towards and away from each other. Preferably the spring loop is located on one side of the imaginary plane in which the pincers move and a remainder of the connecting part is located on the other side of the imaginary plane so as to lead to one pincer located with regard to the other pincer in such a way that springing open of the spring loop moves the pincers towards one another.

The spring clip can be of narrow width, in which case one or more can be clipped onto each edge of a picture or the like. Or, the spring clip width can be increased to the point where it equals the length of a side of a picture or the like to which it is to be applied. Then the spring clip serves as a frame and can be mitre jointed. The spring clip is preferably extruded in plastic and supplied in long lengths from which clips of any width can be cut.

2 Claims, 6 Drawing Figures

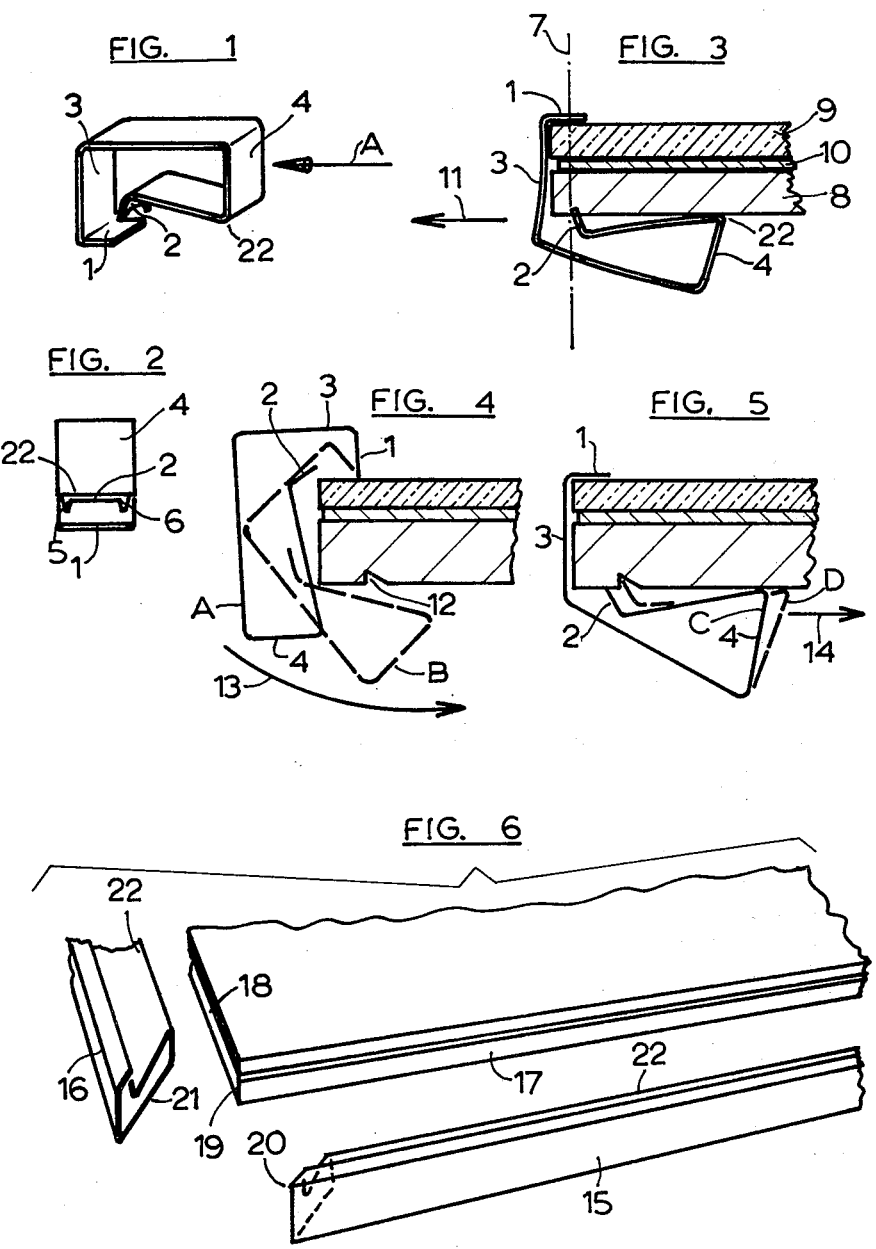

FASTENING CLIPS

BACKGROUND OF THE INVENTION

This invention relates to improvements in and relating to fastening clips, for example fastening clips which are useful for mounting prints on board with a glass top. This kind of clip is useful in preparing prints and paintings, photographs and the like for framing. Prints are also commonly mounted in this way without a frame necessarily being added as well. A clip for this purpose is known to the applicant, but it suffers from numerous disadvantages. On the one hand, the clip is made of somewhat heavy-gauge, narrow metal strip, which clamps together the board and the glass with the print sandwiched between them. If the board tends to warp as a result of being exposed to moisture, however, the strain occasioned by the warping is transmitted by the clips to the glass and because they are rather stiff and narrow, they sometimes cause the glass to break. The spring-clamping action excerted by the clips, so as to keep the glass and the board pressed tightly together, so as to tightly sandwich the prints between them, is also not entirely reliable, tending to weaken and sometimes the clip will even break, hastened on by corrosion of the metal.

A particular embodiment of this invention comprises a clip having the characteristics of this invention, but made with the clip width equal to the full length of a side of, for example, a picture backing board and glass; in this embodiment the ends of the clip can be mitred and so will serve as frames around the edges.

SUMMARY OF THE INVENTION

A clip in accordance with this invention comprises a piece of spring material, having two substantially opposing pincers which are adapted for clamping something between them, a connecting part extending from the first pincer to the other pincer and including a spring loop, which extends from the second pincer. Preferably, the clip is made from a single integral piece of spring material.

Such spring material can be a sheet metal of adequate spring grade, for example a high carbon steel or a spring grade alloy of iron or another metal. The spring material can equally, however, be a suitable type and grade of plastic composition. The plastic clip may be particularly suitable in the embodiment of the invention which in effect constitutes a frame for a picture or the like.

Preferably the spring loop is extended in a general direction substantially orthogonal to an imaginary plane in which the pincers move towards and away from each other.

Preferably, the spring loop is located on one side of the imaginary plane in which the pincers move and a remainder of the connecting part is located on the other side of the imaginary plane so as to lead to one pincer located with regard to the other pincer in such a way that springing open of the spring loop moves the pincers towards one another.

Preferably, one of the two pincers is adapted to present sharp prongs to the surface on which it will bear when in use while the other is adapted to present a flat extended area.

The width of the clips, apart from when the width equals the full edge length, may vary according to the duty to be performed. Thus to clip heavy and thick boards the width may be greater. This is of particular point where plastic clips are formed by extrusion process. The extruded profile can be cut off at any desired length, depending upon the application. Thus, a narrow clip to clip light work together, a wider clip for heavier duty, or a clip whose width equals the full edge length, to serve as a frame, when the ends can be mitred to form mitre joints at corners.

BRIEF DESCRIPTION OF THE DRAWINGS

The invention will be more fully described by way of example with reference to the accompanying drawings, in which:

FIG. 1 is a perspective view of a clip in accordance with a preferred embodiment of the invention, FIG. 2 is an end view of the clip shown in FIG. 1 in the direction of arrow A, FIG. 3 is a side-elevation of the clip shown in the preceding figures when applied to clamping a print between a board and a piece of glass.

FIGS. 4 and 5 show successive steps in attachment of a clip as shown in the preceding figures, and FIG. 6 shows a clip whose width equals the length of an edge for use as a frame.

DESCRIPTION OF THE PREFERRED EMBODIMENTS

As shown in FIGS. 1 and 2, the clip comprises a pincer 1 and a pincer 2, a connecting part including a spring loop 4 and a remainder part 3. The clip is one integral part and is made by bending a strip of spring-sheet metal. The metal is preferably a spring quality stainless steel. In the Applicant's experience, for example a nickel-plated ordinary steel is not sufficiently protected from the effects of corrosion and of corrosion fatigue, and in such a case the spring properties tend to weaken or the clip breaks at critical positions.

As is more particularly clear from the view of FIG. 2, the one pincer 2 has two sharpened prongs 5 and 6, while the other pincer 1 presents a flat extended area.

As will be seen more particularly with reference to FIG. 3, the opposing pincers 1 and 2 are located directly opposite each other in the first place, and in the second place, the connecting part 3 is located on one side of an imaginary plane 7 in which the pincers 1 and 2 are located, while the spring loop 4 is located on the opposite side of that imaginary plane 7.

In FIG. 3, the clip is shown clamping together a board 8 and a glass sheet 9 with a spring 10 sandwiched between them. As can be seen, the sharpened prongs of the pincer 2 have naturally dug into the surfaces of the board 8. A further important feature is that the angular alignment of the pincer 2 is such that if one tries to pull the clip off in a direction as indicated by arrow 11, the pincer 2 would tend to dig even deeper into the board 8, thereby very effectively resisting any such tendency. On the other hand, by contrast, when the clip is pushed onto the edges of the board 8 and the glass 9, the orientation of the sharp points of the pincer 2 is such that they drag over the surface of the board 8, and do not have a tendency to dig in. This bias to the pincer given by its angular alignment makes it very easy for the clip to be pushed over the edges of the board 8 and the glass 9 by means of the fingers, while at the same time ensuring that once the clip is on, it strongly resists coming off again.

It will further be noted that the flat, broad pincer 1 applies the clamping force over an extended area onto the glass plate 9, thereby reducing any tendency for the glass to be cracked if the board 8 warps. The fact that the pincers 1 and 2 are located opposite each other in the plane 7 of course ensures that they act directly against each other provide an effective clamping action.

Because of the sharpened prongs 5 and 6 of the pincer 1, it is not necessary to pre-drill any holes or slots in the surface of the board 8, so as to ensure that the clips will remain in position after it has been applied. Cracking of the glass is also made less probable by the use of relatively thin and wide material, as specified above.

Preferably, the ratio of the thickness of the sheet metal : width of the sheet metal lies between 1 : 10 and 1 : 40. Clips as shown in FIGS. 1 to 3 can of course also be made of plastics, especially extruded and then cut off to desired or required widths, e.g. as shown.

In FIGS. 4 and 5 a modification of application is illustrated, in that a groove 12 is provided in the rear surface of the board 8 for the one pincer 2 of the clip to engage. In this case teeth 5,6 would be superfluous on the clip and are omitted.

FIGS. 4 and 5 show the method of affixing the clip. One starts at the position A, (FIG. 4) pushes the clip in a direction as indicated by arrow 13 to position B (FIG. 4) and on to position C (FIG. 5); a further push in a direction as indicated by arrow 14 to position D (FIG. 5) completes the fixing of the clip.

This method of fixing the clip applies both to the embodiment of the clip shown in FIGS. 1 to 3 and to the embodiment of the clip shown in FIG. 6.

As shown in FIG. 6 the width of each clip, 15,16, can be cut to equal the length of the edge, 17,18 respectively, to which the clip is to be applied. The ends of the clips can moreover be mitre cut 20,21 to permit making mitre joints at the corners 19. Four such clips can then form a complete, mitre jointed frame for a picture or the like. The clips forming frames need not, of course, necessarily be extrusion formed. They could be bent from spring sheet metal.

Apart from clipping or framing between a backing board and glass of a painting, print, photograph, notice or the like, the clip in accordance with this invention can serve any other purpose desired or required.

What is claimed is:

1. A clip which comprises two substantially opposing pincers which are adapted for clamping something between them which is of angular shape, conforming broadly with the outline of a rectangle, comprising two long sides and two short sides formed integrally of spring sheet material, extending from the first pincer at right angles to the left-hand along a first short side of the rectangle, thence at right angles to the lefthand along a first long side of the rectangle, thence at right angles to the left-hand along the second short side of the rectangle, thence at right angles to the left-hand along the second long side of the rectangle and thence at right angles to the right-hand to form the second pincer adjacent the first pincer, the said first long side, second short side and second long side forming a spring loop which extends in a general direction substantially orthogonal to an imaginary plane in which the pincers move towards and away from each other on one side of the imaginary plane, the said first short side being located on the other side of the imaginary plane, such that springing open of the spring loop moves the pincers towards one another.

2. A clip according to claim 1, in which the clip is manufactured from plastics and is a product of an extrusion process.

* * * * *